United States Patent
Jain

(10) Patent No.: US 11,062,294 B2
(45) Date of Patent: Jul. 13, 2021

(54) COGNITIVE BLOCKCHAIN FOR CUSTOMIZED INTERCHANGE DETERMINATION

(71) Applicant: International Business Machines Corporation, Armonk, NY (US)

(72) Inventor: Rahul Jain, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 16/214,692

(22) Filed: Dec. 10, 2018

(65) Prior Publication Data
US 2020/0184448 A1    Jun. 11, 2020

(51) Int. Cl.
| G06Q 20/24 | (2012.01) |
| G06Q 20/14 | (2012.01) |
| G06Q 20/38 | (2012.01) |
| G06Q 20/40 | (2012.01) |
| G06Q 20/20 | (2012.01) |
| G06Q 40/02 | (2012.01) |

(52) U.S. Cl.
CPC ............ G06Q 20/24 (2013.01); G06Q 20/14 (2013.01); G06Q 20/202 (2013.01); G06Q 20/389 (2013.01); G06Q 20/40 (2013.01); G06Q 40/025 (2013.01)

(58) Field of Classification Search
CPC ...... G06Q 20/24; G06Q 20/14; G06Q 20/389; G06Q 20/40; G06Q 20/202; G06Q 40/025; G06Q 20/223; G06Q 20/3827; G06Q 20/4016; G06Q 20/405; G06Q 20/3829; G06Q 20/065; G06Q 20/02; G06Q 20/403

USPC ........................................................ 705/21, 28
See application file for complete search history.

(56) References Cited

U.S. PATENT DOCUMENTS

| 7,624,068 | B1 * | 11/2009 | Heasley .................. G06Q 20/10 705/38 |
| 9,870,562 | B2 | 1/2018 | Davis et al. |
| 10,491,376 | B1 * | 11/2019 | Suthar ................. H04L 12/1407 |
| 2006/0173772 | A1 * | 8/2006 | Hayes ................... G06Q 40/02 705/37 |
| 2009/0327124 | A1 * | 12/2009 | McElroy ............... G06Q 40/02 705/39 |
| 2010/0088204 | A1 * | 4/2010 | Nambiar ............ G06K 15/1882 705/30 |

(Continued)

OTHER PUBLICATIONS

Kristen R. Rice, How Is the Interest Rate Calculated on an Auto Loan With a Cosigner?, Mar. 26, 2017, The Nest (Year: 2017).*

(Continued)

*Primary Examiner* — Andrew Joseph Rudy

(57) ABSTRACT

An example operation may include one or more of identifying, via a cognitive system, that a change in a creditworthiness attribute of a cardholder has occurred with respect to a previous creditworthiness of the cardholder, in response to identifying the change in the creditworthiness attribute of the cardholder, dynamically determining a custom interchange value for the cardholder to be used in payment transactions based on a current credit data of the cardholder, transmitting the dynamically determined custom interchange value for the cardholder to one or more blockchain peer nodes, and storing the dynamically determined custom interchange value in a hash-linked chain of blocks via a distributed ledger.

19 Claims, 15 Drawing Sheets

(56) References Cited

U.S. PATENT DOCUMENTS

| | | |
|---|---|---|
| 2018/0075527 A1 | 3/2018 | Nagla et al. |
| 2018/0276710 A1* | 9/2018 | Tietzen .................. G06N 20/00 |
| 2020/0042989 A1* | 2/2020 | Ramadoss ............ G06Q 20/102 |
| 2020/0219150 A1* | 7/2020 | Johnston ............ G06Q 30/0282 |

OTHER PUBLICATIONS

Godfrey-Welch, Darlene, et al., "Blockchain in Payment Card Systems," SMU Data Science Review, vol. 1, No. 1, Article 3, 44 pages.

* cited by examiner

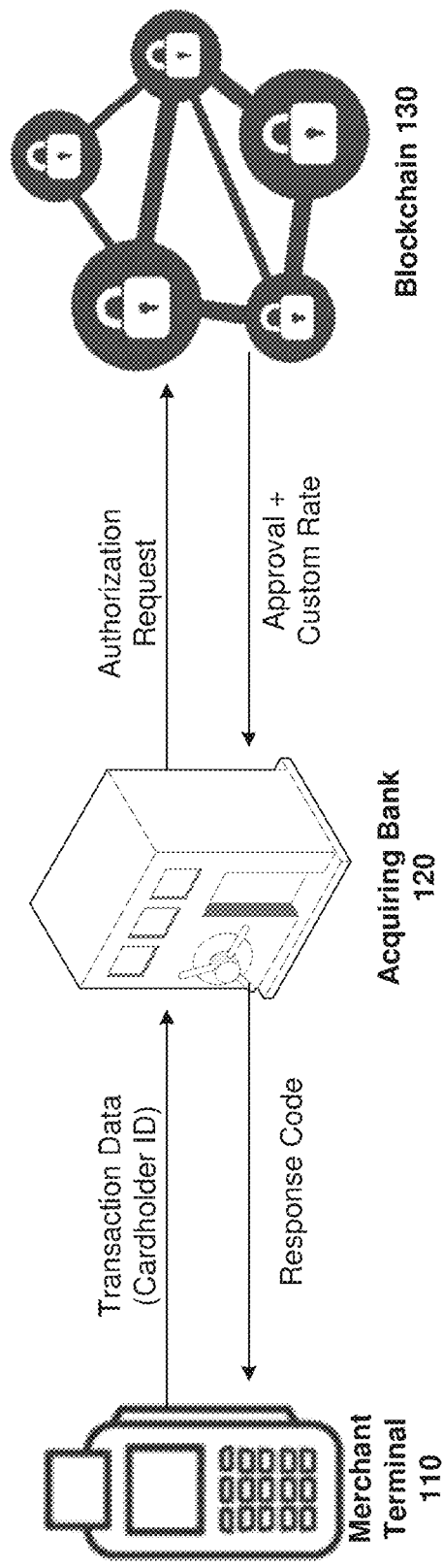

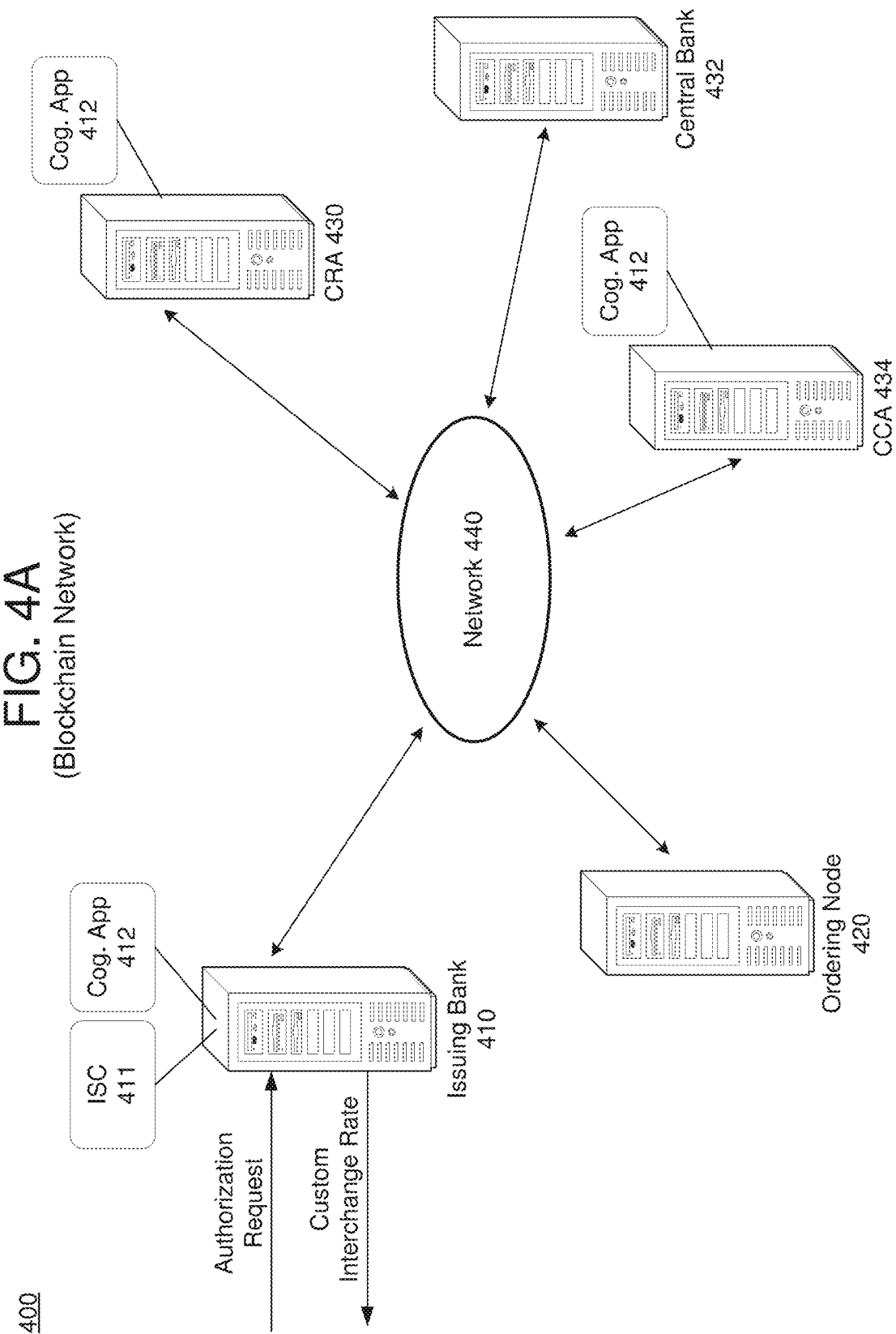

(Pre-Processing Stage)

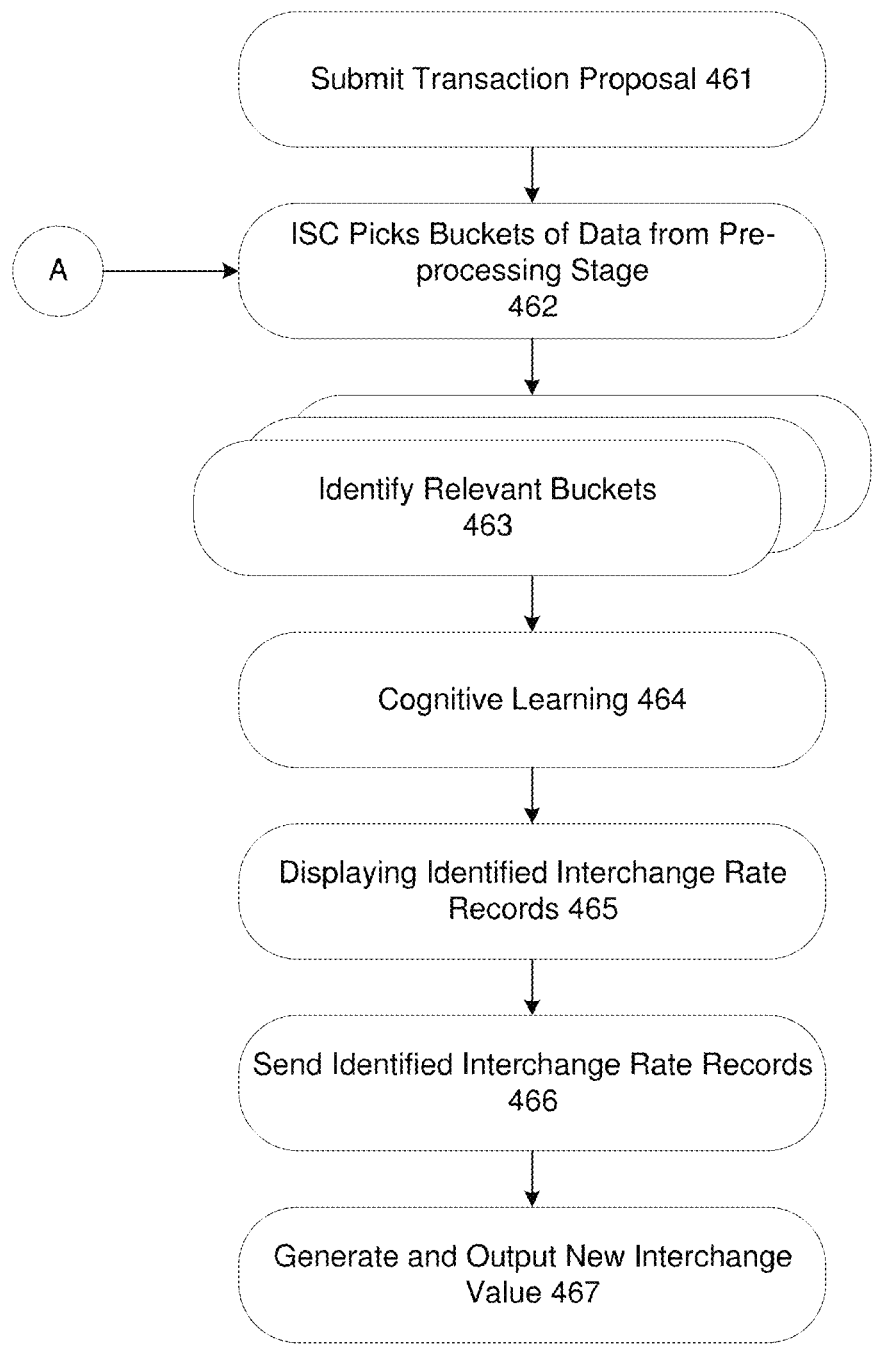

US 11,062,294 B2

COGNITIVE BLOCKCHAIN FOR CUSTOMIZED INTERCHANGE DETERMINATION

TECHNICAL FIELD

This application generally relates to a process performed via blockchain, and more particularly, to blockchain network which cognitively determines when to evaluate a creditworthiness of a cardholder and customize an appropriate interchange rate.

BACKGROUND

Businesses benefit from guaranteed payment, increased sales and lower processing costs than those associated with paper payments such as cash, checks, money orders, and the like. Electronic payments help in lowering the cost and provide businesses with the ability to attract and retain customers with a fast and efficient buying experience. A mode of making these electronic payments is credit and debit cards.

Card-based transactions pass the cost of conducting the transaction to the buyer (i.e., cardholder). The transaction cost can be broadly divided into three parts including an interchange fee, a card scheme fee, and a processing fee. Any of these fees can vary from card-to-card. Interchange is a term used in the payment card industry to describe a fee paid between banks for the acceptance of card-based transactions. Usually it is a fee that a merchant's bank (the "acquiring bank") pays a customer's bank (the "issuing bank") because the issuing bank takes the risk of approving the cardholder, billing the cardholder, and collecting the owed funds from the cardholder. Unfortunately, each year banks write off a portion (e.g., 2-4% of credit card balances) as losses. Theses payment card losses would be costs that sit with retailers if it were not for interchange.

Furthermore, these credit card losses happen irrespective of proper due diligence done by issuer banks while providing the card to the customer. This is due to the increasing risk and rates of fraudulent transactions. Furthermore, each card association (e.g., Visa, Mastercard, etc.) has its own set of interchange reimbursement rates which vary based on multiple factors such as type of business, processing method, etc. Over time, the creditworthiness of the customer can change which might warrant increasing/decreasing the interchange rate charged or upgrading/downgrading/cancelling the card given to the customer. However, there is no way to reliably determine the creditworthiness of a customer right at the instance when the customer uses their card to conduct a transaction. Accordingly, what is needed is a better way for determining a more up-to-date creditworthiness of a consumer for purposes of interchange.

SUMMARY

One example embodiment may provide a system that includes one or more of a processor configured to one or more of identify, via a cognitive system, a change in a creditworthiness attribute of a cardholder has occurred with respect to a previous creditworthiness of the cardholder, and in response to identification of the change in the creditworthiness attribute, dynamically determine a custom interchange value for the cardholder to be used in payment transactions based on a current credit data of the cardholder, a network interface configured to transmit the dynamically determined custom interchange value for the cardholder to one or more blockchain peer nodes, and a storage configured to store the dynamically determined custom interchange value in a hash-linked chain of blocks via a distributed ledger.

Another example embodiment may provide a method that includes one or more of identifying, via a cognitive system, that a change in a creditworthiness attribute of a cardholder has occurred with respect to a previous creditworthiness of the cardholder, in response to identifying the change in the creditworthiness attribute of the cardholder, dynamically determining a custom interchange value for the cardholder to be used in payment transactions based on a current credit data of the cardholder, transmitting the dynamically determined custom interchange value for the cardholder to one or more blockchain peer nodes, and storing the dynamically determined custom interchange value in a hash-linked chain of blocks via a distributed ledger.

Another example embodiment may provide a non-transitory computer readable medium comprising instructions, that when read by a processor, cause the processor to perform one or more of identifying, via a cognitive system, that a change in a creditworthiness attribute of a cardholder has occurred with respect to a previous creditworthiness of the cardholder, in response to identifying the change in the creditworthiness attribute of the cardholder, dynamically determining a custom interchange value for the cardholder to be used in payment transactions based on a current credit data of the cardholder, transmitting the dynamically determined custom interchange value for the cardholder to one or more blockchain peer nodes, and storing the dynamically determined custom interchange value in a hash-linked chain of blocks via a distributed ledger.

BRIEF DESCRIPTION OF THE DRAWINGS

FIG. 1 is a diagram illustrating a payment processing network with a cognitive blockchain according to example embodiments.

FIG. 4A is a diagram illustrating a cognitive blockchain network according to example embodiments.

FIG. 4C is a diagram illustrating a process of determining a custom interchange value according to example embodiments.

DETAILED DESCRIPTION

Figure 2A:
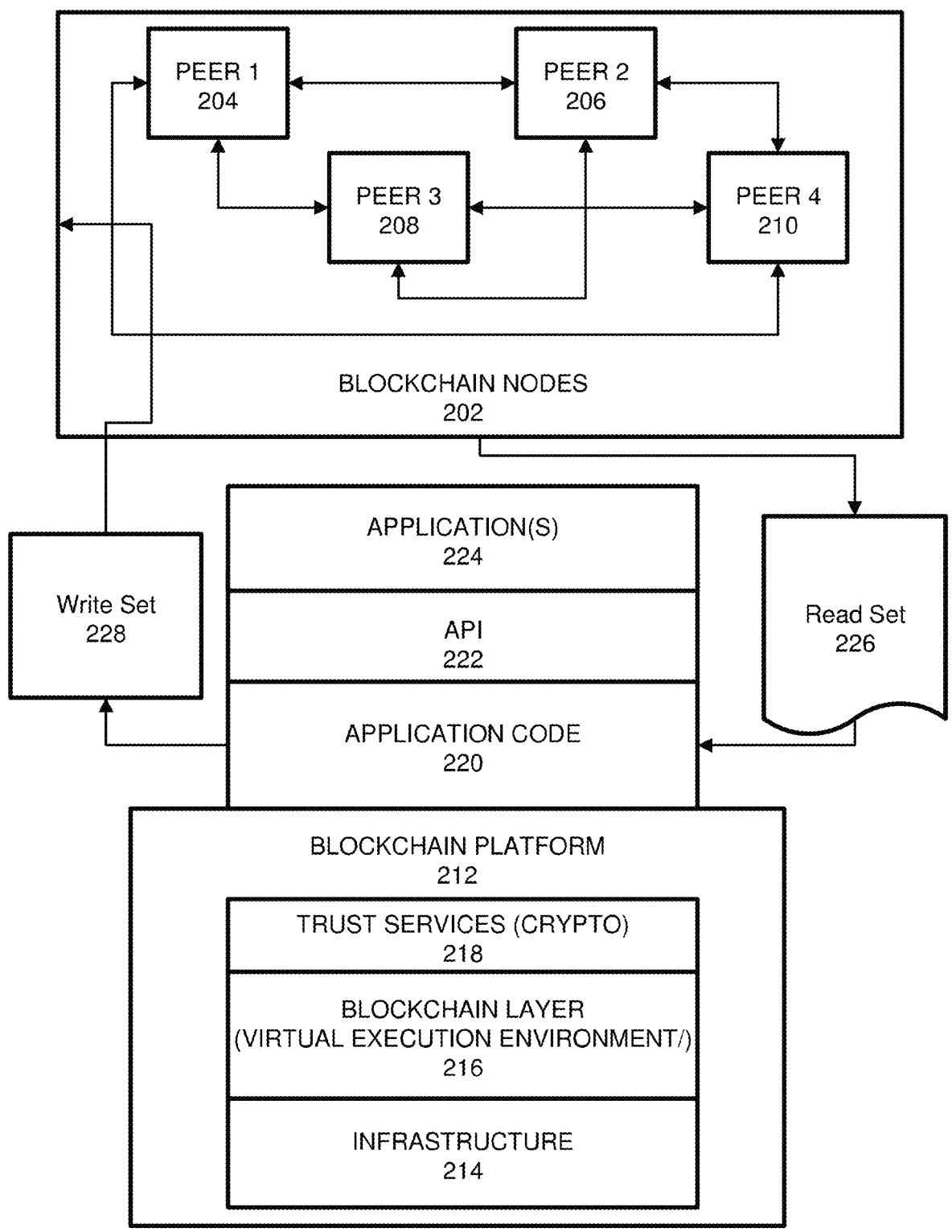
FIG. 2A is a diagram illustrating a peer node blockchain architecture configuration for an asset sharing scenario, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which are directed to a cognitive blockchain system that can identify a point in time at which to re-evaluate a creditworthiness of a user (cardholder) and dynamically determine a custom interchange value for the cardholder based on current credit data associated with the cardholder.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

In a typical transaction at a merchant payment terminal such as a point-of-sale (POS) terminal or mobile POS terminal, a cardholder presents their card which is submitted to the POS terminal and then transmitted to an acquiring bank (merchant bank). In response, the merchant back generates an authorization request (ISO 8583 message) and transmits the request to an issuing bank (cardholder's bank). In response, the issuing bank approves/denies the transaction based on funds of the cardholder's account, and forwards a response including the approval/denial to the acquiring bank in the form of an authorization response. This information is then displayed on the screen at the POS terminal.

However, an interchange fee which is paid by the acquiring bank to the issuing bank to shield the merchant (and acquiring bank) from liability in the case of a fraud/loss is fixedly set at the time the cardholder applied/received the card. In this situation, the creditworthiness of the cardholder may have significantly changed since the interchange fee was determined for the cardholder. Therefore, the previously established interchange fee may not reflect a current risk involved for the issuing bank, and likewise, the fee paid by the acquiring bank for interchange.

The example embodiments overcome these drawbacks by providing a blockchain system that can determine to update or otherwise re-evaluate a creditworthiness of a cardholder and modify a custom interchange value (rate) of the cardholder to reflect the current creditworthiness of a cardholder. Furthermore, the blockchain system may rely on credit data from multiple sources (e.g., credit rating agency (CRA), central bank (CB), credit card association (CCA), issuing bank (IB), and the like) which may be members of the blockchain to customize the interchange value for the cardholder.

According to aspects herein, customization of transaction processing charges based on the current creditworthiness of the card holder may be generated. For example, a cognitive system (implemented by an issuing bank or other member of the blockchain) may suggest the right point of time at which creditworthiness should be determined to not only ensure that every transaction processing doesn't get prolonged due to additional level of verification but also that verification happens frequently enough to mitigate risk to the maximum extent. Furthermore, the cognitive system may analyze the credit data of an individual from multiple blockchain participants and use it along with the data stored in the issuer bank to provide the best possible interchange rate/cancel transaction request etc. in consultation with other stakeholders in the payment ecosystem.

Some benefits of the instant solutions described and depicted herein include reducing transaction cost burden on the end customer with a good/favorable credit rating, helping issuing banks to minimize credit loss due to fraudulent and/or risky transactions, improving interchange-driven fees for retailers who are forced to accept cards even if interchange-driven fees exceeded their profit margins, and the like. In addition, the example embodiments may be used to customize reverse interchange rates as well. Furthermore, blockchain participants can do real-time supervision of interchange rates offered in the market and flag any inordinate changes in rates offered.

Blockchain is different from a traditional database in that blockchain is not a central storage but rather a decentralized, immutable, and secure storage, where nodes must share in changes to records in the storage. If the example embodiments were implemented via a traditional storage system, a single entity would be in control of the interchange fee. In contrast, by using blockchain, no one entity controls interchange rates but rather a consensus among untrusting parties controls interchange rates thereby ensuring a fair interchange determination. Some properties that are inherent in blockchain and which help implement the blockchain include, but are not limited to, an immutable ledger, smart contracts, security, privacy, decentralization, consensus, endorsement, accessibility, and the like, which are further described herein.

Blockchain data is an immutable sequence of blocks, each of which contains a set of ordered transactions. This immutability ensures that the entire history of changes is recorded and thus accountability issues can be fixed. For the example, embodiments, this attribute ensures that none of the blockchain participants can modify the interchange rate of a cardholder without being noticed and a consensus being reached. Smart contract code on multiple peer nodes help in endorsing of the transaction proposal sent by the issuer bank client application. Another smart contract referred to as an Interchange smart contract (ISC) (specific to the example embodiments) can pick a correct set of buckets during a "pre-processing" stage that would have a metadata history of similar transaction requests for same or other customers and send this to the cognitive system in the client application for determination of the interchange rate.

Each organization in the blockchain network can have its own certificate authority and thus use various cryptographic algorithms for attesting transaction. This is done through an MSP process which could be running, depending on implementation, on ordering service and channel levels. Additionally, peers could communicate securely via the TLS protocol.

In the example embodiments, a client application may desire to privately do a transaction such that other participants do not know which issuer bank is sending transaction proposal and whether all the transactions were sent by the same issuer bank application. In such a scenario, an identity mixer can be used. For example, Hyperledger uses identity mixer with membership service provider. Secondly, some members like central bank, credit rating agencies etc. can conduct private transactions and create their own consortium via a facility called channel. Hyperledger provides this facility. To facilitate private communication between issuer bank and subset of peers that endorse, a channel can be established and MSP can control membership for that channel.

Due to the decentralized nature of the blockchain structure, the blockchain network mentioned in the example embodiments would remain functional if some of the peers (such as issuer banks) decide to leave. Therefore, the network is decentralized/distributed. In the example embodiments, consensus needs to be developed between participating peers before ledger update happens. Furthermore, the transaction proposals of an issuer application may be endorsed by the subset of peers as per the endorsement policy of any implementation. Depending on the transaction, an endorsement policy might require it to be endorsed by a single organization and some might need multiple endorsements. Furthermore, an access control list (ACL) may be specified for various peer resources. For example, endorsing peers may have only read access to their ledger but committing peers may have read as well as write access to their copy of the ledger so that they can do the proposed ledger updates.

FIG. 1 illustrates a payment processing network 100 with a cognitive blockchain according to example embodiments. Referring to FIG. 1, the network 100 includes a merchant terminal 110 and an acquiring bank 120, as is known in the art. However, rather than a traditional issuing bank making determinations on the payment transaction (and corresponding interchange fees), the example embodiments implement a cognitive blockchain network 130 which is capable of customizing and dynamically updating an interchange fee/value for a cardholder based on credit data stored and accessed by the members of the cognitive blockchain network 130. A further example of the members of the cognitive blockchain network 130 is shown in the example of FIG. 4A. Here, the merchant terminal 110, the acquiring bank 120, and the blockchain 130 may be connected to each other via a network such as the Internet, a private network, etc.

In the example of FIG. 1, a cardholder presents their card for payment at the merchant terminal 110 which may be a POS terminal, a mobile POS (mPOS) terminal, and the like. The merchant terminal 110 transmits details of a payment transaction to the acquiring bank 120. The acquiring bank 120 generates an authorization request with the payment details and transmits the authorization request to the blockchain 130. In response, the blockchain 130 (which may include an issuing bank of the cardholder) may determine whether the cardholder has necessary funds to complete the transaction and also provide a custom interchange rate for the cardholder that has been stored on the blockchain 130. Accordingly, the blockchain 130 may transmit the custom interchange rate to the acquiring bank 120 via an authorization response. In response, the acquiring bank 120 may transmit a response code to the merchant terminal 110.

Here, the blockchain 130 (e.g., issuing bank node) can send interchange rate along with the response code to the merchant terminal 110 via the acquiring bank 120. If the cardholder is ready to pay the interchange rate, then it can key in the credit card PIN and execute the transaction. As another example, the blockchain (e.g., issuing bank node) can send the interchange rate along with the one-time password (OTP) to the cardholder's mobile phone. If the cardholder is ready to pay the interchange rate, then it can key in the OTP and execute the transaction. In such cases, PIN is not needed and existing infrastructure including merchant's terminal and POS machines need not be modified to display interchange rate.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on an endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In this example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
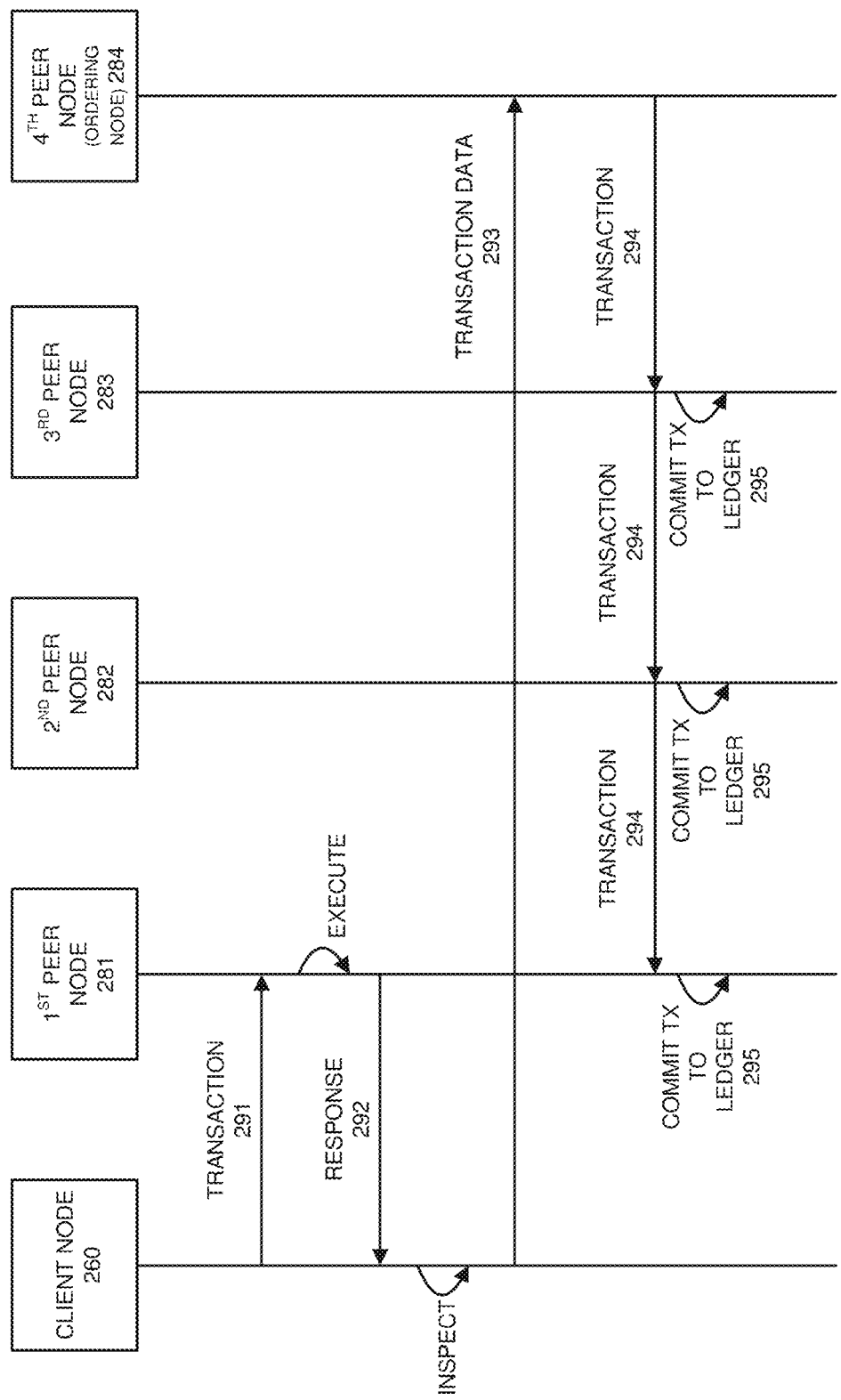
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. The transaction proposal 291 may include a request to store information about execution results of a sub-component of a software model. There may be more than one endorser, but one is shown here for convenience (i.e., peer node 281). The client 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
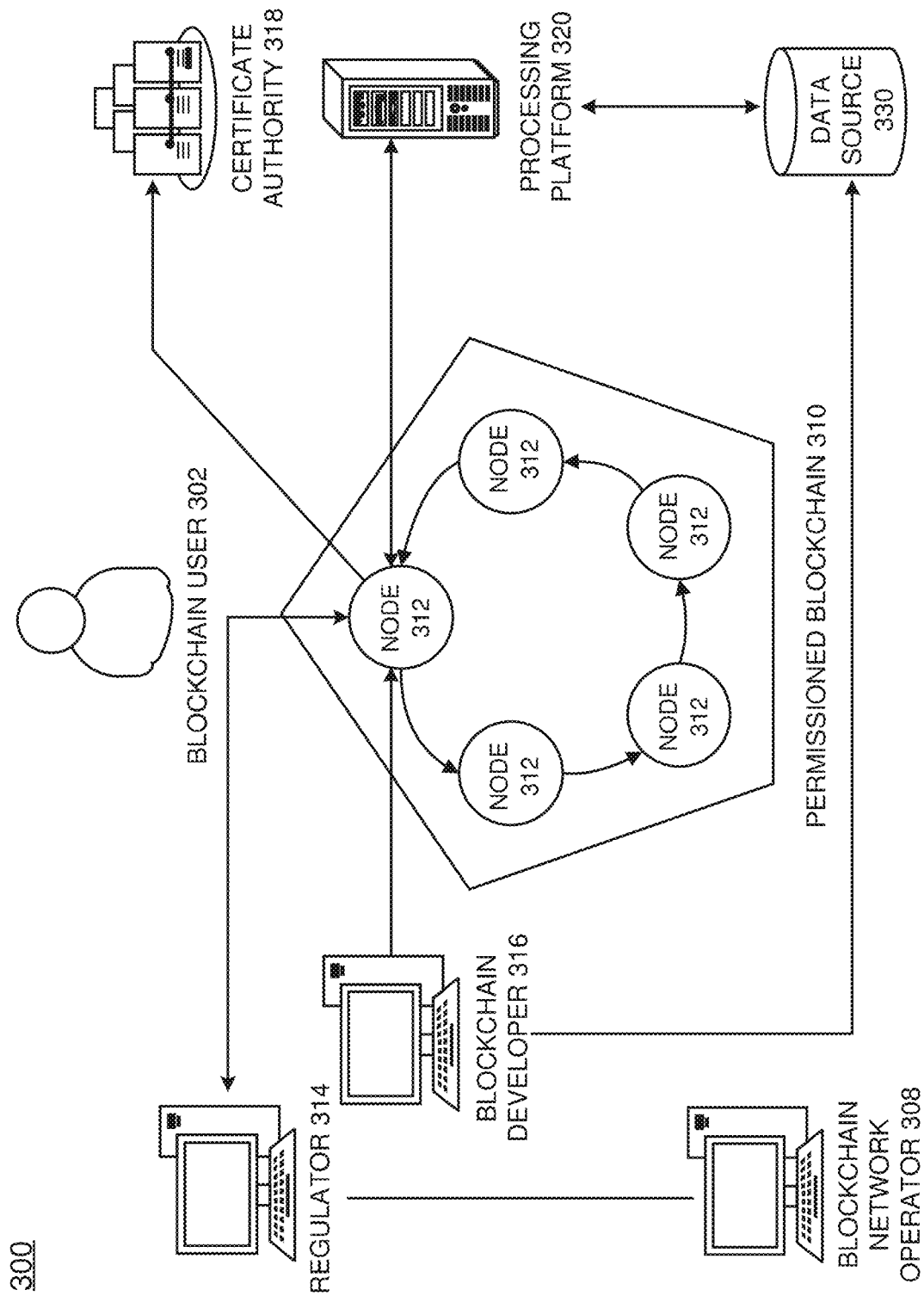
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 314 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIG. 4A illustrates a cognitive blockchain network 400 according to example embodiments. Referring to FIG. 4, the blockchain network 400 includes a plurality of blockchain peer nodes 410, 420, 430, 432, and 434, which are connected via a network 440. The network 440 may be the Internet, a private network, a combination thereof, and the like. For example, the blockchain network 400 may implement the blockchain 130 shown in FIG. 1. Here, the blockchain peer nodes may include an issuing bank node 410, an ordering node 420, a credit reporting agency (CRA) node 430, a central bank node 432, and a consumer credit association (CCA) node 434. Although not shown, additional nodes may be part of the blockchain network 400, and one or more nodes shown may be removed.

During a payment processing scenario, an issuing bank node 410 receives an authorization request such as from a merchant terminal (POS) which may be transferred to the issuing bank node 410 via an acquiring bank system, a payment network, and the like. In response, the issuing bank node 410 may retrieve a customized interchange rate for a cardholder (and a payment card thereof) who is making a purchase transaction with the merchant. Here, the issuing bank node 410 may store account information of the cardholder and can determine whether sufficient funds exist in the cardholder's account. In this case, the issuing bank node 410 can determine whether to approve or deny the transaction based on the cardholder's funds. In addition, according to various embodiments, the issuing bank node 410 can also retrieve a custom interchange fee to be paid by the merchant (and/or the acquiring bank) for the transaction. The interchange fee may be the most recently determined custom interchange fee associated with the cardholder and their payment card.

In addition to processing payments, the blockchain network 400 may self-update a custom interchange fee for a cardholder at intervals of time that are determined or initiated by one or more nodes of the blockchain network 400. The dynamic updating or modifying of the custom interchange fee for the cardholder may be determined in response to receiving the transaction request from the merchant. As another example, the dynamic updating may be determined independently from a processing of a payment transaction. For example, the blockchain network 400 may update the custom interchange fee in response to a creditworthiness attribute of the cardholder changing.

Referring to FIG. 4A, a cognitive application 412 on the issuing bank node 410 may determine whether it is an appropriate time to re-assess or otherwise update a creditworthiness of a cardholder and propose a new interchange rate. Here, the cognitive application 412 may identify various credit related information associated with the cardholder to determine whether any creditworthiness attributes indicate a creditworthiness update check.

For example, the cognitive application 412 may build a corpus with values for data points relevant to cardholders. Examples of the data points associated with a cardholder or other cardholders included, but are not limited to, a card type, a business size and industry type, a transaction type, a most recently creditworthiness reassessment date where creditworthiness was previously assessed, a credit score, and the like. Based on this data, the cognitive application may identify that a creditworthiness check/update needs to be performed when any of these variables changes or otherwise indicates the need.

For example, the cognitive application 412 may manually identify the data points that are dependent on other data points and run a supervised learning algorithm (example: regression) to train the mapping function so that when new input data is received for one independent data point then the cognitive application can predict the value of dependent data point. For those data points that cannot be labelled/mapped to other data points, the cognitive application 412 can run unsupervised learning algorithms (example: association) to determine relationships between them. For all data points, the cognitive application 412 can run unsupervised learning algorithms (example: clustering) to discover inherent groupings among data points. The cognitive application 412 can continue raining the above mentioned cognitive system with data points obtained from different sources having similar purpose and broad characteristics. Furthermore, the cognitive application 412 can use the above trained system to suggest the correct time for the cardholder. Meanwhile, the end user can tweak the suggested value if needed which can further help to train the system.

Figure 4B:
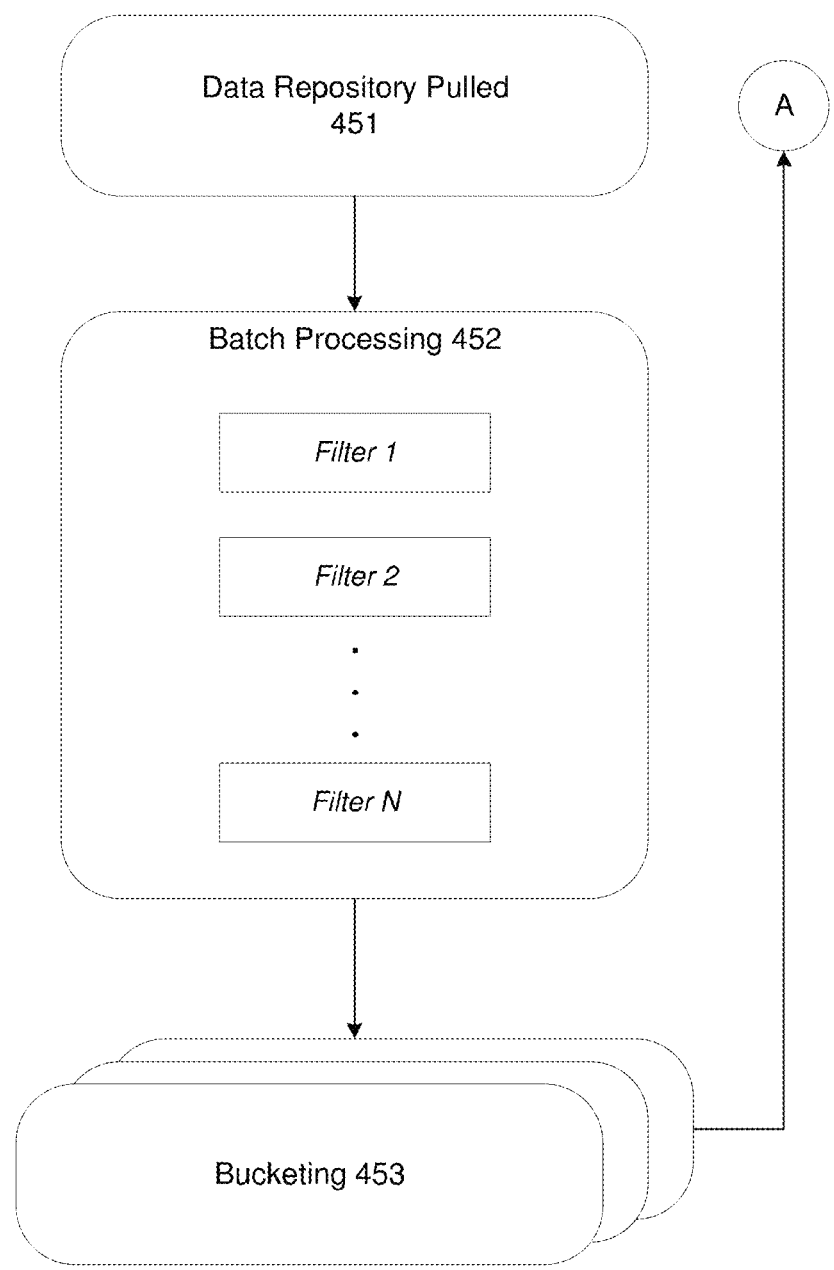
FIG. 4B is a diagram illustrating a process of triggering a creditworthiness check of a cardholder according to example embodiments.

When the cognitive application 412 has determined to update the interchange value of the cardholder, the processes 450 and 460 shown in FIGS. 4B and 4C may be performed. In this example, FIG. 4B illustrates a pre-processing state for updating an interchange value of a cardholder according to example embodiments, and FIG. 4C illustrates a process 460 of determining a custom interchange value according to example embodiments.

Referring to FIG. 4B, metadata for various customer transactions can be pulled from one or more enterprise resource planning (ERP) systems or the like, in 451. The pulled data can be programmatically segregated into groups based on certain filters, in 452. Each such group is called a bucket. Filters are a combination of one of more predefined rules/criteria and weightage of each rule can also be programmed (e.g., such that bucket 1 has more relevant data compared to bucket 2, etc.) Buckets of data is an output of pre-processing stage, in 453. For example: Filter 1 (first filter in the precedence list) can have the most important combination of criteria such as last creditworthiness reassessment date, credit score and geographical location of transaction. Clustering is then applied on a bucket to further determine hidden relationships among the data.

The ERP records described herein may pertain to the data collected by business applications of an enterprise. Here, organizations participating in the blockchain network 400 such as credit rating agency, central bank, peer banks, etc., can have their own set of ERP records. All the participants can contribute their metadata which can be stored in blockchain as off-chain or on-chain data using distributed database, peer-to-peer file system etc. All these depend upon the channel policy implemented which can be different for different implementations.

Referring to FIG. 4C, the issuer bank node 410 may submit an authentication request details of a transaction proposal, in 461. In response to the transaction being validated, in 462, an interchange smart contract 411 (shown in FIG. 4A) may pick up the buckets from preprocessing stage and send it to the cognitive application 412 of the requesting client application which identifies relevant buckets in 463 and then applies clustering to determine clusters with similar relationship between data points, in 464. Generally, it is the peer nodes of the issuer bank that has this smart contract to determine the bucket sets of metadata that need to be picked up from blockchain database. But if the endorsement policy requires then other endorsing peers can also have a copy of ISC and the relevant ERP records to endorse the interchange rate determined.

In 464, clustering is performed. Here the clustering is an unsupervised learning method in the field of machine learning wherein grouping of similar items (credit data of the cardholder) is done without any prior labelling, classification or categorization of that data. Thus, unsupervised learning must learn relationships between elements in the data set and classify the raw data without any help from external sources. The example embodiments use clustering to determine hidden relationships between data points in a bucket of data. These hidden relationships can indirectly hint towards the right interchange rate that can be offered to a particular cardholder based on patterns of risky behavior within their credit data. Unsupervised learning entails hunting for relationships and can take many algorithmic forms, but all models have the same goal. The parameters used for clustering depends on the algorithm used. For example, for K-mean clustering, we input K number of clusters to find, and a Euclidean distance between data points and centroids.

After clustering, a first cluster in sequence having DB records pertaining to interchange rate trends with respect to attributes (buckets) may be displayed to a blockchain participant, in 465. Furthermore, in 466 the client may send the same to an endorsing peer which can play the dual role of an endorser and a committer.

In 467, a custom interchange rate can be provided to the issuing bank node 410 for storage on the blockchain, by the cognitive application 412. Referring again to FIG. 4A, the issuing bank node 410 may transmit the newly determined custom interchange rate for consensus to the other nodes on the blockchain network (430, 432, and 434). In response to the new custom interchange rate being endorsed by the appropriate nodes, the ordering node 420 may store the new custom interchange rate as a transaction in a data block and submit the data block to the peer nodes (410, 430, 432, and 434) for storage in a blockchain on a distributed ledger replicated among the peer nodes. Here, the nodes 410, 430, 432, and 434, may have dual roles of both endorser and committer.

Figure 5:
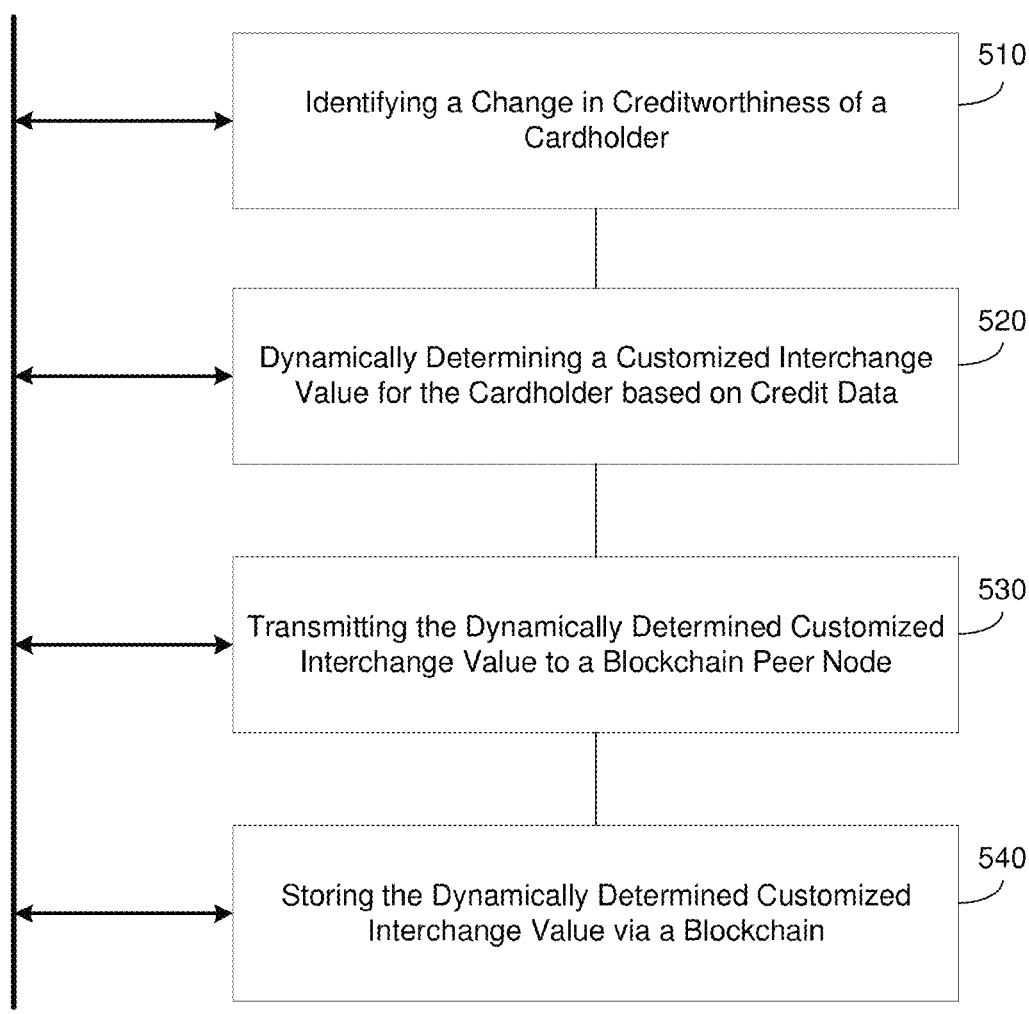
FIG. 5 is a diagram illustrating a method of dynamically determining a custom interchange value according to example embodiments.

FIG. 5 illustrates a method 500 of dynamically determining a custom interchange value according to example embodiments. For example, the method 500 may be performed by a blockchain peer node that may be a computing system and may be associated with a financial entity such as an issuing bank or other credit-based database. As another example, the method 500 may be performed by an off-chain system such as a server, a database, a user device, a combination of devices, and the like. In some embodiments, the method 500 may be performed by a combination of any of the systems.

Referring to FIG. 5, in 510, the method may include identifying, via a cognitive system, that a change in a creditworthiness attribute of a cardholder has occurred with respect to a previous creditworthiness of the cardholder. For example, the cognitive system may be a cognitive application running on a peer node such as an issuer of a payment account issued to the cardholder. The change in attribute may be a change in one or more of a credit score, an amount of time that has passed since the previous creditworthiness was determined, a card type, and a business size, associated with the cardholder. It should be appreciated that these attributes are just for purposes of example and are not meant to limit the types of attributes that can be identified and which can effect/change a creditworthiness of a cardholder. It should also be appreciated that more or different attributes can be included to determine the change in creditworthiness if needed.

In response to identifying the change in the creditworthiness attribute of the cardholder, in 520 the method may include dynamically determining a custom interchange value for the cardholder to be used in payment transactions based on a current credit data of the cardholder. Furthermore, in 530 the method may include transmitting the dynamically determined custom interchange value for the cardholder to one or more blockchain peer nodes, and in 540, the method may include storing the dynamically determined custom interchange value in a hash-linked chain of blocks via a distributed ledger. Here, the dynamically determined custom interchange value may define a fee to be charged by an entity (such as an issuer) that covers a cost of credit risk in a payment transaction of the cardholder for another entity such as a retailer or an acquiring bank of the retailer.

In some embodiments, the dynamically determining may include dynamically determining the custom interchange value for the cardholder based on a plurality of attributes included in an enterprise resource planning (ERP) system of an issuer of a payment account of the cardholder. In some embodiments, the dynamically determining may include dynamically determining the custom interchange value based on a credit data of other cardholders received from a plurality of blockchain peer nodes. In some embodiments, the dynamically determining the custom interchange value may include replacing a previously assigned custom interchange value of the cardholder with a new custom interchange value for the cardholder comprising a different value.

In some embodiments, the method may further include receiving an authorization request from a merchant point-of-sale (POS) terminal and transmitting an authorization response to the merchant POS terminal which comprises the dynamically determined custom interchange value for the cardholder stored in the hash-linked chain of blocks. In some embodiments, the storing may include storing the dynamically determined custom interchange value for the cardholder via a blockchain on the distributed leger in response to a consensus by a plurality of nodes of the blockchain.

Figure 6A:
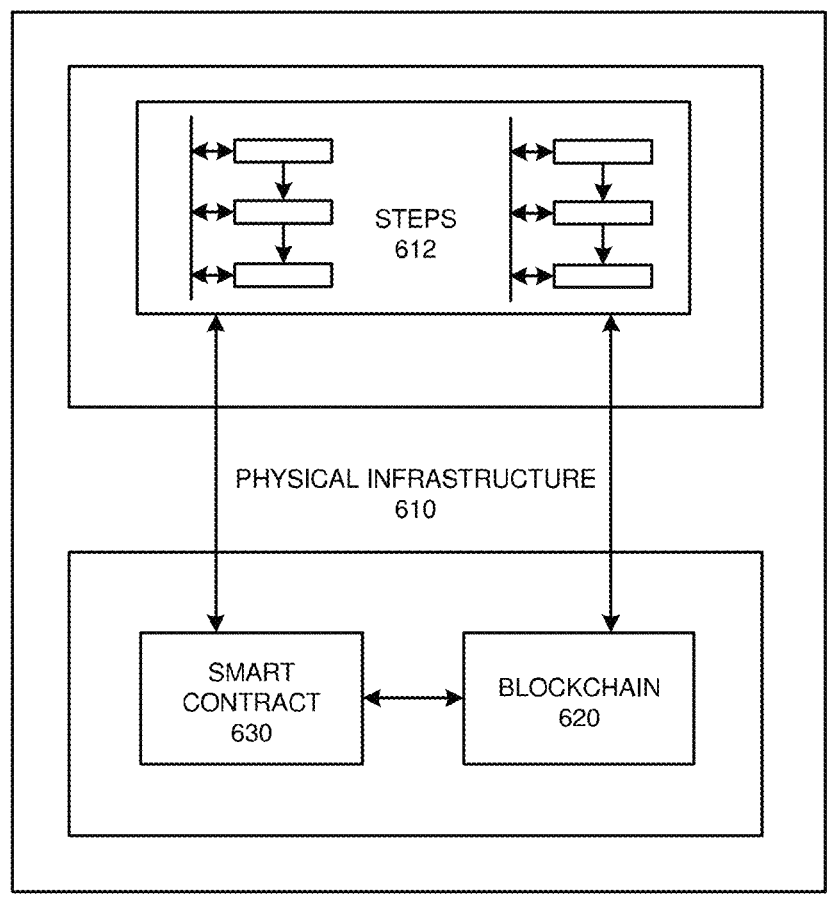
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps 612 may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
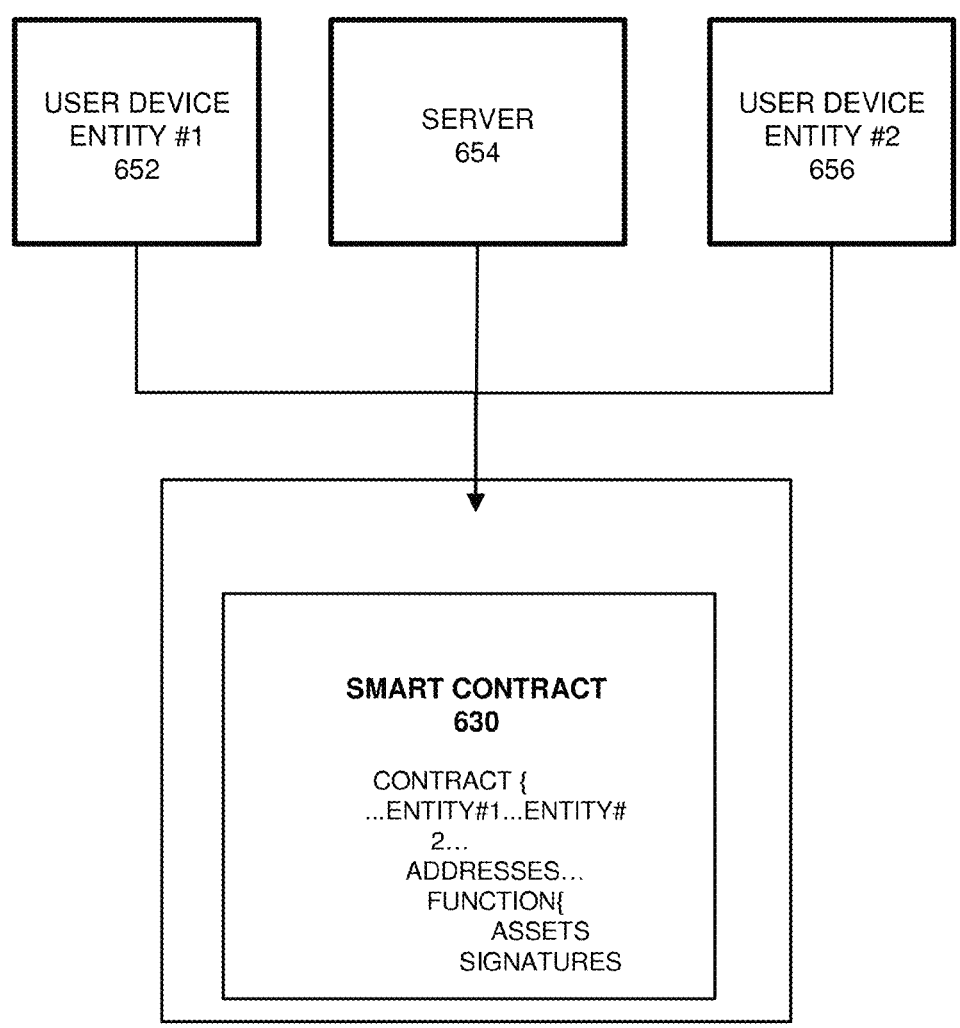
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
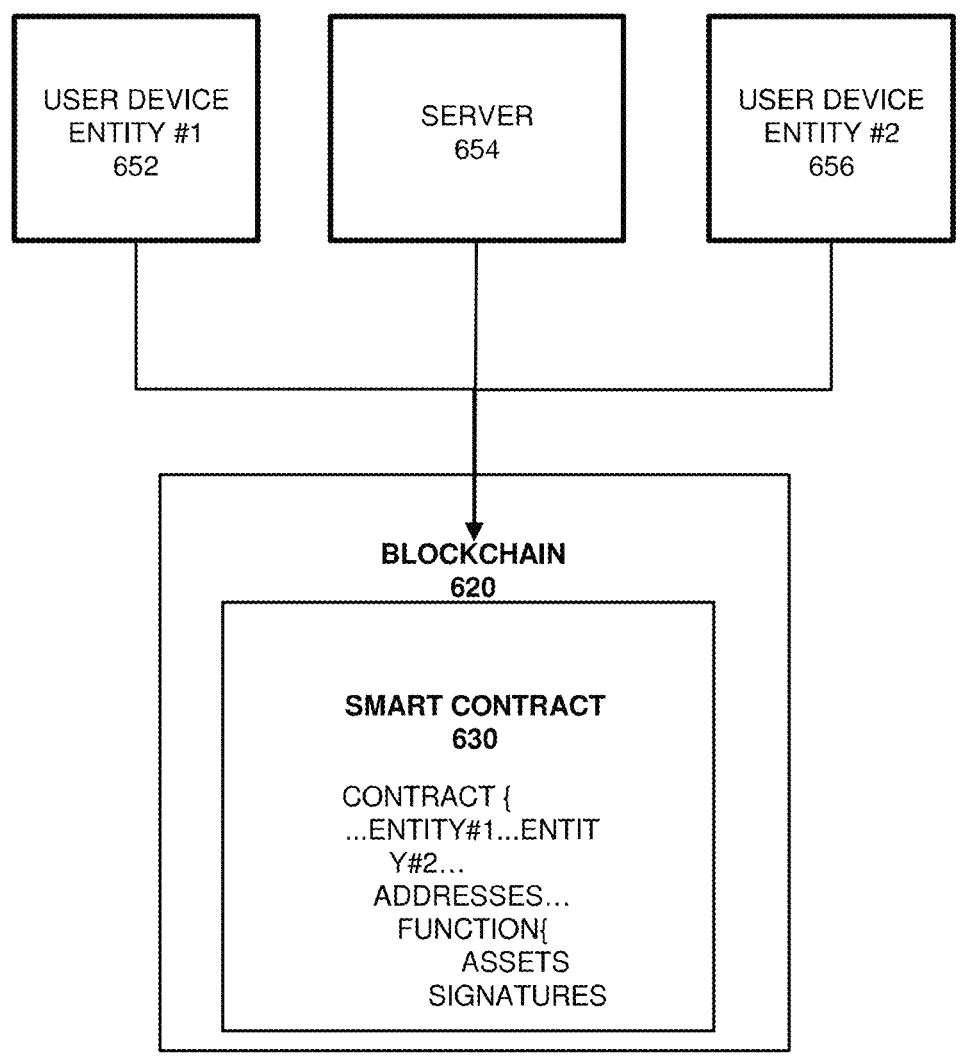
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
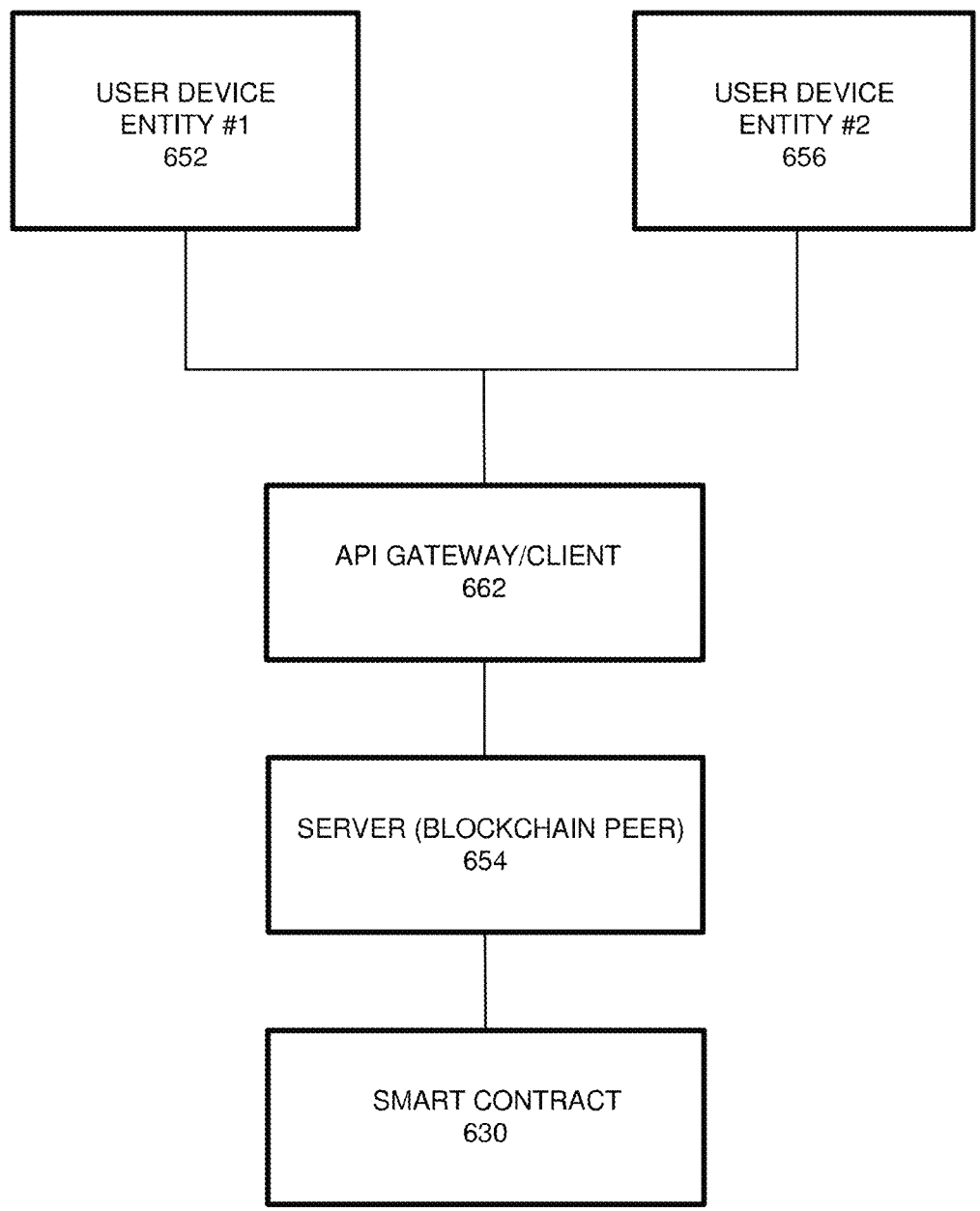
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7A:
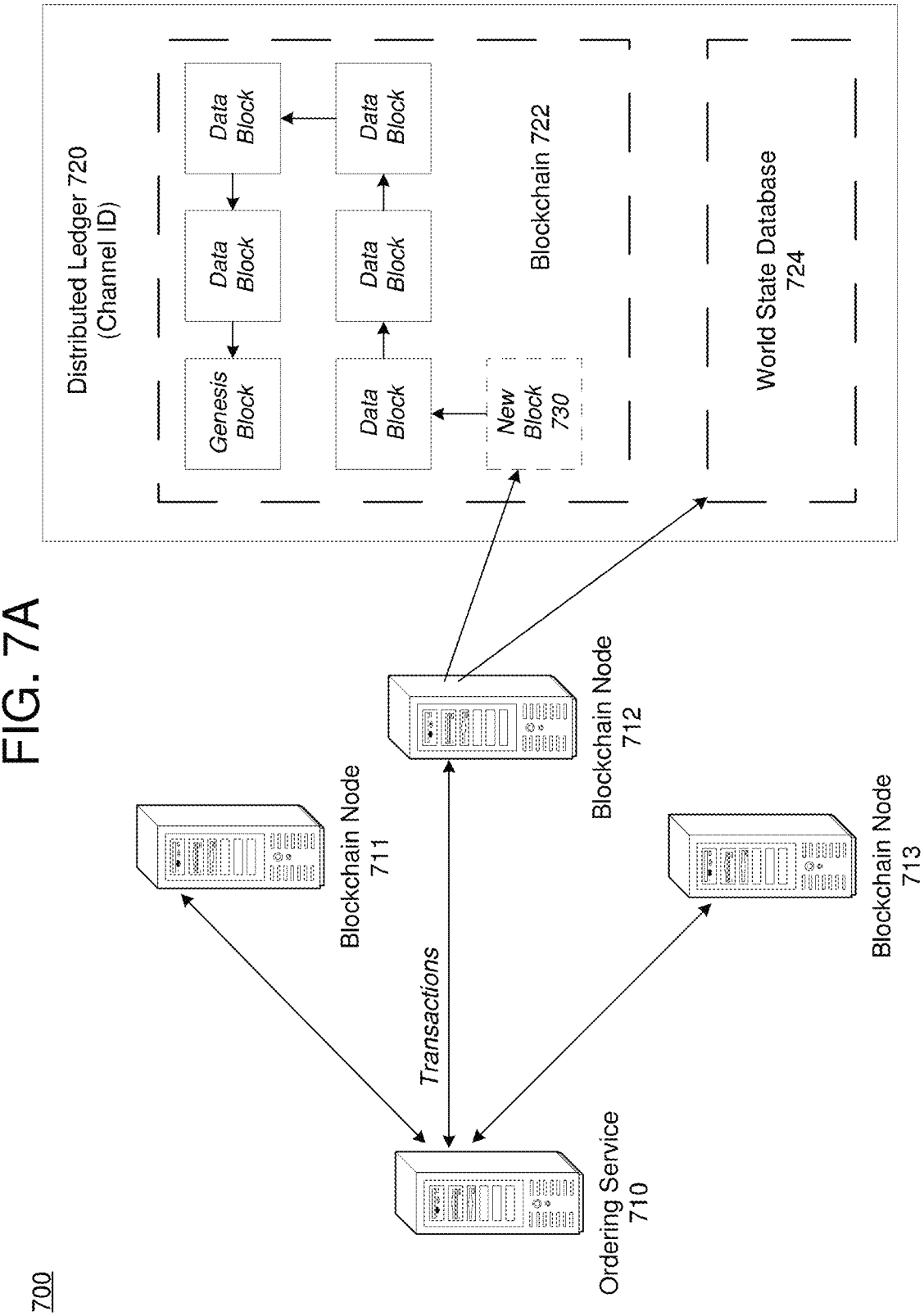
FIG. 7A is a diagram illustrating a process of a new block being added to a blockchain ledger, according to example embodiments.
Figure 7B:
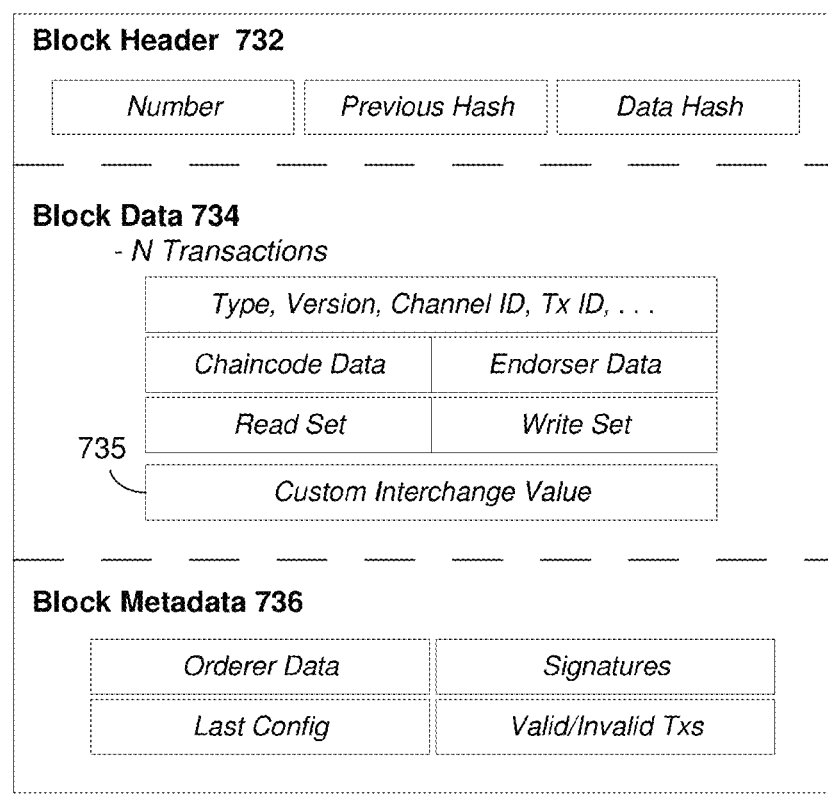
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722.

Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, in addition to traditional blockchain-based information, the block data 734 may store a custom interchange value 735 that is dynamically determined and customized for a cardholder. The custom interchange value 735 may be determined based on an endorsement policy implemented by nodes of the blockchain and stored within the blockchain when a predetermined number of nodes have endorsed the dynamically determined custom interchange value 735. Each time the custom interchange value 735 is updated or otherwise re-evaluated, a new entry can be stored on the blockchain within a data block. Therefore, an immutable record of the modifications to the custom interchange value 735 over time can be determined from the chain. Data structure of each block would specifically depend on the way the embodiment is implemented. But, if the implementation requires storage of off-chain data in a distributed way so that nodes subscribing to that data can retrieve it then block data 734 needs to store some additional information. Each transaction within the block data section should have provision to hold the data chunk hashes and sizes. We can then create multiple named streams of data to which nodes can subscribe. And when the node sees the reference to some off-chain data then it can use the hash and content address to request for retrieving the data.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
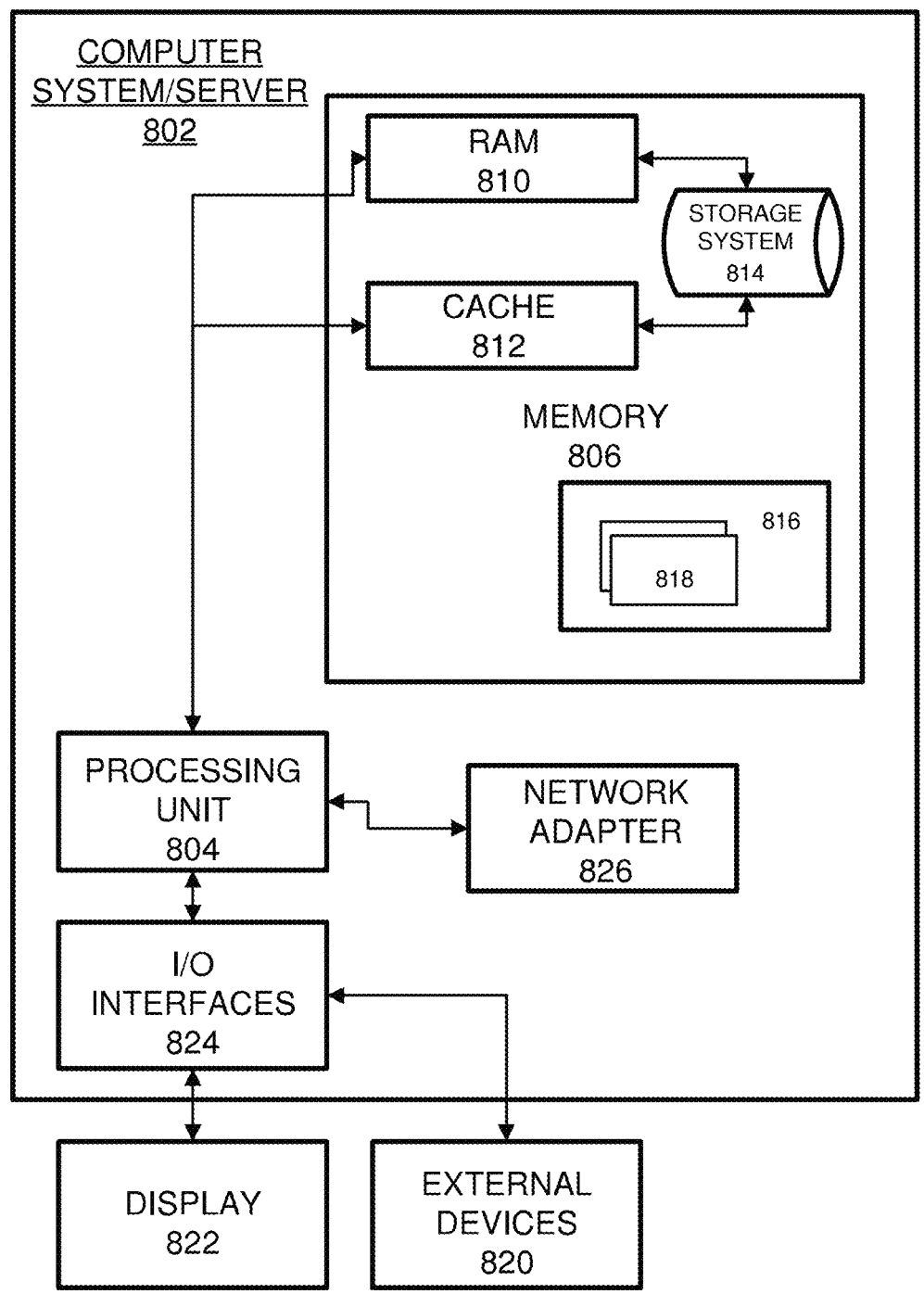
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a processor configured to detect, via a machine learning model, a change in a creditworthiness attribute of a cardholder has occurred based on patterns in data of the cardholder received from multiple data sources, and dynamically update, via a smart contract of a blockchain, a custom interchange value for the cardholder to be used in payment transactions based on the detected change in the creditworthiness attribute of the cardholder;
a network interface configured to transmit the dynamically updated custom interchange value for the cardholder to a plurality of blockchain peer nodes corresponding to a plurality of different participants of the blockchain; and a storage configured to store the dynamically determined custom interchange value in a hash-linked chain of blocks of the blockchain, wherein the processor is further configured to determine that the plurality of blockchain peers have reached a consensus on the dynamically updated custom interchange value prior to storing the dynamically determined custom interchange value.

2. The computing system of claim 1, wherein the dynamically updated custom interchange value defines a fee to be charged by an entity that covers a cost of credit risk in a payment transaction of the cardholder.

3. The computing system of claim 1, wherein the machine learning model comprises an unsupervised learning model that identifies relationships between data points from the plurality of data sources.

4. The computing system of claim 1, wherein the processor is configured to dynamically determine the dynamically updated custom interchange value for the cardholder based on a plurality of attributes included in an enterprise resource planning (ERP) system of an issuer of a payment account of the cardholder.

5. The computing system of claim 1, wherein the processor is configured to dynamically determine the dynamically updated custom interchange value based on a credit data of other cardholders received from a plurality of blockchain peer nodes.

6. The computing system of claim 1, wherein the processor is configured to replace a previously assigned custom interchange value of the cardholder with the dynamically updated custom interchange value that comprises a different value.

7. The computing system of claim 1, wherein the network interface is further configured to receive an authorization request from a merchant point-of-sale (POS) terminal and transmit an authorization response to the merchant POS terminal which comprises the dynamically updated custom interchange value for the cardholder stored in the hash-linked chain of blocks.

8. A method comprising:
    detecting, via a machine learning model, a change in a creditworthiness attribute of a cardholder has occurred based on patterns in data of the cardholder received from multiple data source;
    dynamically updating, via a smart contract of a blockchain, a custom interchange value for the cardholder to be used in payment transactions based on the detected change in the creditworthiness attribute of the cardholder;
    transmitting the dynamically updated custom interchange value for the cardholder to a plurality of blockchain peer nodes corresponding to a plurality of different participants of the blockchain; and
    storing the dynamically determined custom interchange value in a hash-linked chain of blocks of the blockchain,
    wherein the method further comprises determining that the plurality of blockchain peers have reached a consensus on the dynamically updated custom interchange value prior to storing the dynamically determined custom interchange value.

9. The method of claim 8, wherein the storing comprises storing the dynamically updated custom interchange value for the cardholder, data hashes and sizes in response to a consensus by a plurality of nodes of the blockchain.

10. The method of claim 8, wherein the dynamically updated custom interchange value defines a fee to be charged by an entity that covers a cost of credit risk in a payment transaction of the cardholder.

11. The method of claim 8, wherein the machine learning model comprises an unsupervised learning model that identifies relationships between data points from the plurality of data sources.

12. The method of claim 8, wherein the dynamically determining comprises dynamically determining the dynamically updated custom interchange value for the cardholder based on a plurality of attributes included in an enterprise resource planning (ERP) system of an issuer of a payment account of the cardholder.

13. The method of claim 8, wherein the dynamically determining comprises dynamically determining the dynamically updated custom interchange value based on a credit data of other cardholders received from a plurality of blockchain peer nodes.

14. The method of claim 8, wherein the dynamically updating comprises replacing a previously assigned custom interchange value of the cardholder with the dynamically updated custom interchange value comprising a different value.

15. The method of claim 8, further comprising receiving an authorization request from a merchant point-of-sale (POS) terminal and transmitting an authorization response to the merchant POS terminal which comprises the dynamically updated custom interchange value for the cardholder stored in the hash-linked chain of blocks.

16. A non-transitory computer readable medium comprising instructions that when read by a processor cause the processor to perform a method comprising:
    detecting, via machine learning model, a change in a creditworthiness attribute of a cardholder has occurred based on patterns in data of the cardholder received from multiple data sources;
    dynamically updating, via a smart contract of a blockchain, a custom interchange value for the cardholder to be used in payment transactions based on the detected change in the creditworthiness attribute of the cardholder;
    transmitting the dynamically updated custom interchange value for the cardholder to a plurality of blockchain peer nodes corresponding to a plurality of different participants of the blockchain; and
    storing the dynamically determined custom interchange value in a hash-linked chain of blocks of the blockchain,
    wherein the method further comprises determining that the plurality of blockchain peers have reached a consensus on the dynamically updated custom interchange value prior to storing the dynamically determined custom interchange value.

17. The non-transitory computer-readable medium of claim 16, wherein the dynamically updating comprises dynamically determining the dynamically updated custom interchange value based on a credit data of other cardholders received from a plurality of blockchain peer nodes.

18. The non-transitory computer-readable medium of claim 16, wherein the dynamically updated custom interchange value defines a fee to be charged by an entity that covers a cost of credit risk in a payment transaction of the cardholder.

19. The non-transitory computer-readable medium of claim 16, wherein the machine learning model comprises an unsupervised learning model that identifies relationships between data points from the plurality of data sources.

* * * * *